(12) United States Patent
Nishio et al.

(10) Patent No.: US 11,485,119 B2
(45) Date of Patent: Nov. 1, 2022

(54) ANTIFOULING FILM EQUIPPED WITH PROTECTIVE FILM AND METHOD FOR MANUFACTURING SAME

(71) Applicant: TOYOBO CO., LTD., Osaka (JP)

(72) Inventors: Akiko Nishio, Otsu (JP); Akinori Terada, Otsu (JP)

(73) Assignee: TOYOBO CO., LTD., Osaka (JP)

(*) Notice: Subject to any disclaimer, the term of this patent is extended or adjusted under 35 U.S.C. 154(b) by 30 days.

(21) Appl. No.: 16/982,761

(22) PCT Filed: Mar. 14, 2019

(86) PCT No.: PCT/JP2019/010497
§ 371 (c)(1),
(2) Date: Sep. 21, 2020

(87) PCT Pub. No.: WO2019/188327
PCT Pub. Date: Oct. 3, 2019

(65) Prior Publication Data
US 2021/0008858 A1 Jan. 14, 2021

(30) Foreign Application Priority Data
Mar. 29, 2018 (JP) ............... JP2018-064262

(51) Int. Cl.
*C08J 5/18* (2006.01)
*B32B 27/28* (2006.01)
*G02B 1/18* (2015.01)

(52) U.S. Cl.
CPC ........... *B32B 27/283* (2013.01); *C08J 5/18* (2013.01); *G02B 1/18* (2015.01); *B32B 2307/7145* (2013.01); *C08J 2343/04* (2013.01)

(58) Field of Classification Search
CPC ......... B32B 27/283; B32B 2307/7145; B32B 27/08; B32B 2571/00; B32B 27/285; B32B 27/302; B32B 27/304; B32B 27/34; B32B 27/36; B32B 27/365; B32B 2457/20; B32B 27/306; B32B 27/308; B32B 27/32; B32B 27/40; B32B 2255/10; B32B 2255/26; B32B 2307/732; B32B 2419/00; B32B 2479/00; B32B 2509/00; B32B 7/06; C08J 5/18; C08J 2343/04; C08J 2367/02; C08J 2483/04; C08J 7/0427; G02B 1/18; G02B 1/14
See application file for complete search history.

(56) References Cited

U.S. PATENT DOCUMENTS 9,290,602 B2 * 3/2016 Saegusa ............... C08J 7/043
2006/0165934 A1 * 7/2006 Okazaki ............ C09D 133/26
428/40.1
2007/0202297 A1 8/2007 Takada et al.
2008/0305292 A1 12/2008 Okazaki et al.
2011/0162680 A1 * 7/2011 Saito .................. C11D 1/04
106/287.3
2015/0322278 A1 11/2015 Araki
2018/0079187 A1 3/2018 Satoh
2018/0118907 A1 5/2018 Sakamoto et al.

FOREIGN PATENT DOCUMENTS

| CN | 101065246 A | 10/2007 |
|---|---|---|
| CN | 201203677 Y | 3/2009 |
| CN | 107107543 A | 8/2017 |
| CN | 107531029 A | 1/2018 |
| JP | 2006-192734 A | 7/2006 |
| JP | 2008-105234 A | 5/2008 |
| JP | 5989291 B1 | 9/2016 |
| KR | 10-2015-0105943 A | 9/2015 |
| KR | 10-2017-0076660 A | 7/2017 |
| NO | 2004/058900 A1 | 7/2004 |
| WO | 2016/068112 A1 | 5/2016 |
| WO | 2017/057402 A1 | 4/2017 |

OTHER PUBLICATIONS

International Search Report dated Jun. 11, 2019, issued in counterpart International Application No. PCT/JP2019/010497 (1 page).
Office Action dated Aug. 17, 2021, issued in counterpart CN Application No. 201980023326.7, with English translation. (20 pages).
Office Action dated May 27, 2022, issued in counterpart KR Application No. 10-2020-7030729, with English Translation. (10 pages).
Decision of Rejection dated May 5, 2022, issued in counterpart CN Application No. 201980023326.7, with English Translation. (12 pages).

* cited by examiner

*Primary Examiner* — Michael B Nelson
(74) *Attorney, Agent, or Firm* — WHDA, LLP

(57) ABSTRACT

[PROBLEM] To provide an antifouling film equipped with protective film having an antifouling layer with excellent antifouling characteristics even after aging, and to a method for manufacturing same. [SOLUTION MEANS] An antifouling film equipped with protective film in which protective film is laminated on an antifouling layer of an antifouling film having an antifouling layer on a substrate film X, the antifouling film equipped with protective film being such that, when the protective film is detached from the antifouling film, a contact angle of water with respect to a surface of the protective film that had been in contact with the antifouling layer of the antifouling film is 90° to 115°. And also a method for manufacturing the aforementioned antifouling film equipped with protective film in which aging is carried out under certain temperature conditions while the protective film is laminated to a surface of the antifouling layer.

2 Claims, No Drawings

ANTIFOULING FILM EQUIPPED WITH PROTECTIVE FILM AND METHOD FOR MANUFACTURING SAME

FIELD OF ART TO WHICH THE INVENTION PERTAINS

The present invention relates to an antifouling film equipped with protective film having excellent antifouling characteristics, and to a method for manufacturing same.

BACKGROUND ART

In recent years, as personal computers and mobile telephones, and also smartphones and other such mobile terminal apparatuses, have become more commonplace, there has been an increased need to protect such objects from fouling, scratches, and the like. Especially with touchpanels and other such display surfaces for which visual perceptibility is required despite the fact that such surfaces are always being touched, it is essential that these be imparted with antifouling characteristics. Furthermore, technology for imparting antifouling characteristics has also come to be applied to paintings and other works of art, and wall surfaces and other building materials, as well as furniture and other such objects whose external appearance is perceived to be important.

While methods for imparting objects with antifouling characteristics include methods in which the object is directly coated, simpler methods in the form of techniques in which film materials having antifouling layer(s) coated/laminated therewithin are caused to be attached to the object are more typically employed. As methods for forming antifouling layers, while methods in which these are formed by means of heat treatment with use of silane coupling agents having perfluoroalkyl groups are convenient, there is the problem that damage to the film can occur due to the comparatively high temperatures at which treatment must be carried out. For this reason, a technique has been employed in recent years in which a perfluoroalkyl-group-containing compound that is soluble in an organic solvent is crosslinked at low temperature through use of a crosslinking agent (see Patent Reference No. 1).

PRIOR ART REFERENCES

Patent References

PATENT REFERENCE NO. 1: Japanese Patent No. 5989291

SUMMARY OF INVENTION

Problem to be Solved by Invention

While it is possible by causing crosslinking of a fluorine-containing resin to easily form a membrane having excellent antifouling characteristics, this requires aging due to the long reaction time. As the fluorine-containing resin is made to undergo aging while in a rolled-up state, there has been the problem that antifouling characteristics are not adequately achieved when aging is allowed to proceed while the fluorine-containing resin is in contact with the film surface.

It is an object of the present invention to solve the problems present in the aforementioned conventional art, and to provide an antifouling film equipped with protective film having an antifouling layer with excellent antifouling characteristics even after aging has been carried out, and to a method for manufacturing same.

Means for Solving Problem

As a result of intensive efforts to solve the foregoing problems, the present inventor(s) discovered that a benefit could be realized whereby an antifouling layer having excellent antifouling characteristics could be obtained. That is, the present invention is constituted as follows.

1. An antifouling film equipped with protective film in which protective film is laminated on an antifouling layer of an antifouling film having an antifouling layer on a substrate film X, the antifouling film equipped with protective film being such that, when the protective film is detached from the antifouling film, a contact angle of water with respect to a surface of the protective film that had been in contact with the antifouling layer of the antifouling film is 90° to 115°.

2. The antifouling film equipped with protective film according to 1., above, wherein the antifouling layer of the antifouling film comprises silicone-type resin and/or fluorine-type resin as primary constituent.

3. The antifouling film equipped with protective film according to 1. or 2. wherein a surface of the protective film that comes in contact with the antifouling layer of the antifouling film satisfies FORMULA 1;

wherein FORMULA1 is $|a-b| \leq 10(°)$;

wherein a is a contact angle (°) of water with respect to a surface of the protective film that will come in contact with the antifouling layer of the antifouling film, as it exists prior to lamination with the antifouling layer of the antifouling film; and wherein b is a contact angle (°) of water with respect to a surface of the protective film that had been in contact with the antifouling layer of the antifouling film, as it exists when detached from the antifouling layer of the antifouling film.

4. The antifouling film equipped with protective film according to any of 1. through 3. wherein the protective film has a resin functional layer on substrate film Y; the surface of the protective film that comes in contact with the antifouling layer of the antifouling film is the resin functional layer; and not less than 60% concentration by mass as a percent of all resin content making up the resin functional layer is at least one resin chosen from among silicone-type, cyclic-olefin-type, acyclic-olefin-type, and fluorine-type resins.

5. A method for manufacturing the antifouling film equipped with protective film according to any of 1. through 4. in which aging is carried out for not less than one day at a temperature which is not less than 30° C. but not greater than 60° C. while the protective film is laminated to a surface of the antifouling layer.

Benefit of Invention

The present invention makes it possible to cause antifouling characteristics of an antifouling layer to be exhibited to the maximum degree possible as a result of control of the contact angle of water with respect to a surface of a protective film that has been detached from the antifouling layer of the antifouling film following aging.

EMBODIMENTS FOR CARRYING OUT INVENTION

The present invention is described in detail below.

The antifouling film equipped with protective film of the present invention is such that substrate film X is coated with an antifouling layer, and following drying this is laminated with protective film.

Substrate Film X of Antifouling Film

There is no particular limitation with respect to the material, shape, and so forth of the substrate film X on which the antifouling layer is laminated in accordance with the present invention.

There being no particular limitation with respect to the polymer(s) making up substrate film X, any of various plastics and/or elastomers such as polyethylene, polypropylene, polybutene, and/or other such polyolefins, polyethylene terephthalate, polyethylene naphthalate, polybutylene terephthalate, cyclohexanedimethanol copolyester, neopentyl glycol copolyester, isophthalic acid copolyester, 5-sodiosulfo isophthalic acid copolyester, and/or other such polyesters, nylon 6, nylon 66, MXD6, and/or other such polyamides, polystyrene, polyester polyurethane, polyether polyurethane, polyether polyester polyurethane, polycarbonate polyurethane, polycaprolactam polyurethane, and/or other such polyurethanes, polycarbonate, polyvinyl chloride, polyvinylidene chloride, poly(meth)acrylic acid ester (acrylic resin), ethylene-vinyl acetate copolymer, styrene-butadiene copolymer, vinyl chloride-acrylic acid ester copolymer, vinyl chloride-vinyl acetate copolymer, polyvinyl butyral, acrylonitrile-acrylic acid ester copolymer, fluorine-containing polymers, as well as silicone-type polymers and/or silicone-containing polymers, and so forth may, for example, be used alone, or a mixture of a plurality thereof may be used without restriction, a film thickness thereof which is 25 µm to 500 µm being preferred.

Any material may be used alone for substrate film X, or a mixed system such as a polymer alloy may be used therefor, or the structure thereof may be such that a plurality of types of materials are laminated together. While there is no particular problem regardless of whether the configuration of the substrate film is such that it is in sheet form or in roll form, as manufacturing efficiency is better when this is in roll form, it is generally employed.

Antifouling Layer of Antifouling Film

The antifouling layer of the antifouling film of the present invention comprises silicone-type resin and/or fluorine-type resin as primary constituent. Here, the antifouling layer of the antifouling film of the present invention includes those that are crosslinked and cured through use of a crosslinking agent, and what is here described as primary constituent means that the combined amount of the silicone-type resin and/or fluorine-type resin contained within the solids content, expressed in terms of mass, of the coating solution used to form the antifouling layer is not less than 50 mass %.

As silicone-type antifouling agent, an organopolysiloxane having dimethylpolysiloxane as primary constituent and/or the like may, for example, be employed, it being possible for a portion of the methyl groups to be substituted with phenyl group(s), ethyl group(s), isopropyl group(s), hexyl group(s), cyclohexyl group(s), hydroxyl group(s), vinyl group(s) and/or the like. In other respects, there being no particular limitation with respect thereto, it is possible for this to be modified terminally by means of polyether, polyester, acrylic and/or other such organic functional group(s).

As fluorine-type antifouling agent, resins comprising perfluoroalkyl group(s), perfluoroalkylene ether group(s), and so forth may be cited as examples. It is also possible to employ those in which there is bonding to dimethyl silicone or other such organic siloxane and/or the like.

Silicone-type antifouling agent and fluorine-type antifouling agent may each respectively be used alone, or a mixture of two or more antifouling agents may be used.

Furthermore, the antifouling layer may have a crosslinked structure. As crosslinking agent for the antifouling layer, tolylene diisocyanate, 2,4-tolylene diisocyanate, 4,4'-diphenylmethane diisocyanate, xylylene diisocyanate, polymethylene polyphenyl isocyanate, and other such aromatic diisocyanates, tetramethylene diisocyanate, hexamethylene diisocyanate, and other such lower aliphatic diisocyanates, cyclopentylene diisocyanate, cyclohexylene diisocyanate, isophorone diisocyanate, hydrogenated products of the aforementioned aromatic diisocyanates and other such alicyclic isocyanates, and other such isocyanate-type crosslinking agents, methyl etherified melamine resin, butyl etherified melamine resin, and other such melamine-type crosslinking agents, epoxy-type crosslinking agents, metal-chelate-type crosslinking agents, and so forth may be cited as examples.

Furthermore, to speed up formation of the crosslinked structure, known catalysts may be used, and it is also possible to use known organic solvents to carry out dilution for the purpose of lowering viscosity or the like during coating of the antifouling layer.

Method of Applying the Antifouling Layer

There being no particular limitation with respect to the method by which the antifouling layer is applied to the substrate film X, known methods may be employed to apply this thereto. More specifically, coating methods which employ direct gravure coaters, microgravure coaters, reverse gravure coaters, direct kiss coaters, reverse kiss coaters, comma coaters, die coaters, and bar- and rod-type coating apparatuses and the like may be cited as examples.

Drying of the Antifouling Layer

It is preferred that the drying temperature following coating be not less than 80° C. but less than 180° C. Not less than 80° C. is preferred because at 80° C. and higher it will be possible to prevent drying of the solvent from being inadequate, and it will be possible to prevent adhesion with respect to the protective film from becoming too high during aging due to presence of residual solvent, as a result of which there might otherwise be occurrence of excessive delamination during detachment. Furthermore, less than 180° C. is preferred because below 180° C. there will be little tendency for the substrate film X to undergo contraction and/or deformation due to heat, and it will be possible for drying to take place while causing planarity to be maintained.

A drying time which is not less than 1 second but is less than 180 seconds is preferred. Not less than 1 second is preferred because when this is carried out for 1 second and longer it will be possible to prevent drying of the solvent from being inadequate, and it will be possible to prevent adhesion with respect to the protective film from becoming too high during aging due to presence of residual solvent, as a result of which there might otherwise be occurrence of excessive delamination during detachment. Less than 180 seconds is preferred from the standpoint of manufacturability because when this is carried out for less than 180 seconds it will be possible to reduce cost.

It is preferred that thickness of the antifouling layer following drying be not less than 0.01 µm and not greater than 20 µm. Not less than 0.01 µm is preferred because endurance with respect to friction will be satisfactory when this is not less than 0.01 μm. Not greater than 20 μm is preferred because there will be little tendency for residual solvent to remain at the antifouling layer drying operation, and there will be little tendency for excessive delamination to occur during detachment following aging, when this is not greater than 20 μm.

Lamination Operation

It is preferred in the sense of improving manufacturability that the operation, described below, in which protective film is laminated to the antifouling layer be carried out during the period up to the time when the film is rolled up into a rolled state following application of the antifouling layer to the substrate film X and drying thereof.

Treatment using a laminator is preferably employed as the lamination method. As the compression bonding method, application of pressure under vacuum or application of pressure or any combination thereof may be carried out. It is preferred that temperature at the time of compression bonding be not less than 20° C. but less than 80° C. Not less than 20° C. is preferred because where this is the case, adhesion between the protective film and the antifouling layer will be satisfactory. Less than 80° C. is preferred because where this is the case, it will be possible to prevent a situation from occurring in which adhesion between the protective film and the antifouling layer is too high.

Aging

Aging being carried out in such fashion that the antifouling layer is in contact with the protective film following application of the antifouling layer to the substrate film X and drying thereof, aging may be employed without regard to whether this is in sheet form or roll form. Carrying out aging while in roll form after it has been rolled up into a rolled state will be excellent in terms of manufacturability and will be a simple method.

Where it is said that the antifouling layer is in contact with the protective film, more specifically this means that it is directly in contact therewith, air between the antifouling layer and the protective film being completely removed therefrom such that there is intimate contact therebetween without presence of bubbles.

It is preferred that aging be carried out at not less than 30° C. but not greater than 60° C. Not less than 30° C. is preferred because this will promote the crosslinking reaction at the antifouling layer and make it possible to increase curability. Not greater than 60° C. is preferred because this will make it possible to prevent situations in which softening of the antifouling layer occurs, and in which adhesion of surface(s) in contact with the antifouling layer becomes too high such that detachment thereof is made difficult. It is more preferred that this be not less than 35° C. but not greater than 55° C., and still more preferred that this be not less than 38° C. but not greater than 52° C.

It is preferred that aging time be not less than 1 day but less than 10 days. Not less than 1 day is preferred because it will be sufficient time for heat to be adequately conveyed all the way to the central portion of the roll, such that curing is made to take place, without occurrence of situations in which crosslinking is inadequate, all the way to where the antifouling layer is present near the roll core. Less than 10 days is preferred, as even when aging temperature is low the crosslinking reaction will be able to proceed to completion and there will be no reduction in manufacturability.

Adhesive Layer

The antifouling film equipped with protective film of the present invention may be such that an adhesive layer is provided at the surface which is opposite the surface on which the antifouling layer is formed at substrate film X. Provision of an adhesive layer will make it possible to easily affix this to a display or the like. The adhesive layer may employ customary adhesive(s), it being possible to cite rubber-type adhesives, acrylic adhesives, olefinic adhesives (modified olefinic adhesives and so forth), silicone-type adhesives, and so forth as examples.

The antifouling film equipped with protective film of the present invention provides excellent antifouling characteristics under conditions such that the contact angle of water with respect to the surface of the protective film that had been in contact with the antifouling layer is 90° to 115° when the protective film is detached from the antifouling layer of the antifouling film. It is more preferred that this be under conditions such that the contact angle of water is 90° to 110° with respect thereto, and most preferred that this be under conditions such that the contact angle of water is 95° to 105° with respect thereto. Because when the contact angle of water with respect thereto is not less than 90°, as there will be no possibility of offsetting of resin even when the surface of the protective film, described below, that had been in contact with the antifouling layer is a resin functional layer, described below, and as there will be no possibility that the antifouling characteristics of the antifouling layer will be impaired, this is preferred. Furthermore, because when the contact angle of water with respect thereto is not greater than 115°, as there will be no possibility that there will be offsetting of antifouling components within the antifouling layer onto the resin functional layer of the protective film, and as there will be no possibility that the antifouling characteristics of the antifouling film will be impaired, this is preferred.

Furthermore, it is preferred that the antifouling film equipped with protective film of the present invention satisfy FORMULA 1, below.

$$|a-b|\leq 10(°) \ldots \qquad \text{FORMULA 1}$$

where a=contact angle (°) of water with respect to the surface of the protective film that will come in contact with the antifouling layer of the antifouling film, as it exists prior to lamination with the antifouling layer of the antifouling film; and b=contact angle (°) of water with respect to the surface of the protective film that had been in contact with the antifouling layer of the antifouling film, as it exists when detached from the antifouling layer of the antifouling film.

When $|a-b|\leq 10(°)$, because it will be possible to prevent reduction in the antifouling characteristics of the antifouling layer of the antifouling film following detachment from the protective film following aging, this is preferred.

It is preferred that the protective film of the present invention be a laminated film that has a resin functional layer on at least one face of substrate film Y. It is still more preferred that substrate film Y be polyester film, advantageously employed for which might be film obtained by stretching following melt extrusion of polyester resin using a known method, the thickness of which might be 9 μm to 250 μm. Furthermore, the polyester substrate film may contain any of various stabilizers, ultraviolet-resistant agents, antistatic agents, lubricants, pigments, antioxidants, plasticizers, and so forth.

The polyester resin that makes up the aforementioned polyester substrate film may be polyester homopolymer or may be polyester copolymer. Where this comprises polyester homopolymer, one which may be obtained by polycondensation of an aromatic dicarboxylic acid and an aliphatic diol is preferred. Citable as the aromatic dicarboxylic acid are terephthalic acid, isophthalic acid, 2,6-naphthalenedicarboxylic acid, and so forth; citable as the aliphatic glycol are ethylene glycol, 1,3-propanedil, 1,4-butanediol, 1,4-cyclohexanedimethanol, neopentyl glycol, and so forth. Examples of typical polyester homopolymers include polyethylene terephthalate (PET), polyethylene naphthalate (PEN), polytrimethylene terephthalate (PTT), polybutylene terephthalate (PBT), and so forth, polyethylene terephthalate being particularly preferred. Furthermore, citable as the dicarboxylic acid component of the polyester copolymer are any one or two or more species chosen from among isophthalic acid, phthalic acid, terephthalic acid, 2,6-naphthalenedicarboxylic acid, adipic acid, sebacic acid, oxycarboxylic acid (e.g., P-oxybenzoic acid, etc.), and so forth; citable as the diol component are any one or two or more species chosen from among ethylene glycol, diethylene glycol, 1,3-propanediol, 1,4-butanediol, 1,4-cyclohexanedimethanol, neopentyl glycol, and so forth. In any event, what is referred to as polyester in the context of the present invention is preferably polyester in which ordinarily not less than 60 mol % and preferably not less than 80 mol % of the repeating units therein are ethylene terephthalate.

In accordance with the present invention, an easy-to-adhere layer may be provided between the substrate film Y and the resin functional layer for the purpose of increasing adhesion of the resin functional layer of the protective film. While there is no particular limitation with respect to the resin(s) used in the easy-to-adhere layer, it is preferred that it contain any one, two, or three compositions among acrylic, polyester-type, and urethane-type compositions, it being possible for crosslinking agent to be used in combination therewith as necessary. As the method by which the easy-to-adhere layer is provided, while it is possible to employ an inline coating method in which it is provided at the time that the substrate film Y is being formed, or an offline coating method in which it is provided after the base film has been formed, the inline coating method is preferred from the standpoint of cost and so forth.

Resin functional layer(s) may be provided on one face or on both faces of the protective film. As the composition of the resin functional layer, silicone-type, cyclic-olefin-type, acyclic-olefin-type, and fluorine-type resins may be cited. Such resin(s) may be used as primary resin or may be used as additive in the form of binder resin. There is no particular limitation with respect binder resin, it being possible, for example, to employ UV-curing-type resins obtained by causing acryl group(s), vinyl group(s), epoxy group(s), and/or other such functional group(s) to be cured as a result of irradiation with UV light, as well as ester-type resins, urethane-type resins, olefin-type resins, acryl-type resins, and other such thermoplastic resins, and/or epoxy-type resins, melamine-type resins, and other such thermosetting resins.

It is preferred that not less than 60% concentration by mass as a percent of all resin content making up the resin functional layer(s) of the protective film be at least one resin chosen from among silicone-type, cyclic-olefin-type, acyclic-olefin-type, and fluorine-type resins. Not less than 60% concentration by mass is preferred, as this will make it possible to effectively make|a-b|, i.e., the absolute value of the difference in contact angle before versus after lamination with the antifouling layer, be not greater than 10°. It is more preferred that this be not less than 80 mass %. There is no objection to employment of an upper limit of 100 mass %, and there is no objection to this being not greater than 98 mass %.

What is here referred to as silicone-type resins are resins having an intramolecular silicone structure, it being possible to cite examples including reactive curable silicone resins, silicone graft resins, alkyl-modified silicone resins and other such modified silicone resins, and so forth.

As reactive curable silicone resins, those of the addition reaction type, those of the condensation reaction type, those of the ultraviolet-light- or electron-beam-cured type, and so forth may be used.

As silicone resins of the addition reaction type, those in which a platinum catalyst may be used to cause reaction and curing of a hydrogen siloxane and a polydimethylsiloxane in which a vinyl group has been introduced at a side chain or at an end may be cited as examples. At such time, use of a resin that is capable of being cured within 30 seconds at 120° C. is more preferred, as it will permit working at low temperatures. As examples thereof, those manufactured by Dow Corning Toray Co., Ltd., of the low-temperature addition curing type (LTC1006L, LTC1056L, LTC300B, LTC303E, LTC310, LTC314, LTC350G, LTC450A, LTC371G, LTC750A, LTC752, LTC755, LTC760A, LTC850, etc.) and of the thermal UV curing type (LTC851, BY24-510, BY24-561, BY24-562, etc.), those manufactured by Shin-Etsu Chemical Co., Ltd., of the solvent addition type (KS-774, KS-882, X62-2825, etc.), of the solvent addition+UV curing type (X62-5040, X62-5065, X62-5072T, KS5508, etc.), and of the dual-cure curing type (X62-2835, X62-2834, X62-1980, etc.), and so forth, may be cited. As silicone resins of the condensation reaction type, those in which an organotin catalyst may be used to cause condensation reaction, with formation of a three-dimensional crosslinked structure, of a polydimethylsiloxane having a terminal H group and a polydimethylsiloxane having a terminal OH group, may be cited as examples. As silicone resins of the ultraviolet-light-cured type, examples which may be cited include, as the most fundamental variety thereamong, those employing the same radical reaction as in ordinary silicone rubber crosslinking, those in which an unsaturated group has been introduced and which are photocurable, those in which ultraviolet light is used to decompose an onium salt and generate a strong acid which causes cleavage of an epoxy group and occurrence of crosslinking, those in which crosslinking is made to occur by addition reaction of thiol to vinyl siloxane, and so forth. Furthermore, an electron beam may be employed instead of the aforementioned ultraviolet light. As electron beams are of higher energy than ultraviolet light, it is possible to cause the crosslinking reaction to occur by means of radicals without the need to use an initiator such as would be the case with ultraviolet light curing. As resins that may be used, those manufactured by Shin-Etsu Chemical Co., Ltd., which are silicones of the UV curing type (X62-7028A/B, X62-7052, X62-7205, X62-7622, X62-7629, X62-7660, etc.), those manufactured by Momentive Performance Materials Inc. which are silicones of the UV curing type (TPR6502, TPR6501, TPR6500, UV9300, UV9315, XS56-A2982, UV9430, etc.), and those manufactured by Arakawa Chemical, Ltd., which are silicones of the UV curing type (Silcolease UV POLY 200, POLY 215, POLY 201, KF-UV265AM, etc.) may be cited as examples.

As the aforementioned silicone resins of the ultraviolet-light-cured type, those employing acrylate-modified or glycidoxy-modified polydimethylsiloxane or the like may be used. Such a modified polydimethylsiloxane may be mixed with polyfunctional acrylate resin, epoxy resin, and/or the like and used in the presence of an initiator.

Cyclic-olefin-type resins comprise cyclic olefin(s) as polymer component(s). Cyclic olefins, i.e., polymerizable cyclic olefins having ethylenic double bond(s) within the ring(s), may be categorized as being monocyclic olefins, bicyclic olefins, polycyclic olefins having three rings or more, and so forth.

As monocyclic olefins, cyclobutene, cyclopentene, cycloheptene, cyclooctene, and other such cyclic C4-12 cycloolefins and so forth may be cited as examples.

Examples of bicyclic olefins include 2-norbornene; 5-methyl-2-norbornene, 5,5-dimethyl-2-norbornene, 5-ethyl-2-norbornene, 5-butyl-2-norbornene, and other such norbornenes having an alkyl group (C1-4 alkyl group); 5-ethylidene-2-norbornene and other such norbornenes having an alkenyl group; 5-methoxycarbonyl-2-norbornene, 5-methyl-5-methoxycarbonyl-2-norbornene, and other such norbornenes having an alkoxycarbonyl group; 5-cyano-2-norbornene and other such norbornenes having a cyano group; 5-phenyl-2-norbornene, 5-phenyl-5-methyl-2-norbornene, and other such norbornenes having an aryl group; octaline; 6-ethyl-octahydronaphthalene and other such octaline with an alkyl group; and so forth.

As polycyclic olefins, dicyclopentadiene; 2,3-dihydrodicyclopentadiene, methanooctahydrofluorene, dimethanooctahydronaphthalene, dimethanocyclopentadienonaphthalene, methanooctahydrocyclopentadienonaphthalene, and other such derivatives; 6-ethyl-octahydronaphthalene and other such derivatives having substituent(s); adducts of tetrahydroindene and cyclopentadiene and so forth, trimers and tetramers of cyclopentadiene; and so forth may be cited as examples.

Acyclic-olefin-type resins comprise acyclic olefin(s) as polymer component(s). As acyclic olefins, ethylene, propylene, 1-butene, isobutene, 1-pentene, 2-methyl-1-butene, 3-methyl-1-butene, 1-hexene, 3-methyl-1-pentene, 4-methyl-1-pentene, 1-heptene, 1-octene, 1-decene, 1-dodecene, 1-tetradecene, 1-hexadecene, 1-octadecene, 1-icosene, and other such alkenes and so forth may be cited as examples.

Rubber may be employed as surface treatment resin. Copolymers of butadiene, isoprene, and so forth may be cited as examples. Any one olefin-type resin may be used alone, or two or more thereof may be copolymerized together, without regard to whether these are cyclic olefin(s) and/or acyclic olefin(s). Cyclic-olefin-type resin(s) and acyclic-olefin-type resin(s) may be partially hydroxyl-group- and/or acid-modified. Crosslinking agent may be used to cause crosslinking with such functional group(s). Crosslinking agent(s) may be selected as appropriate in correspondence to modification group(s), it being possible to cite examples which include tolylene diisocyanate, 2,4-tolylene diisocyanate, 4,4'-diphenylmethane diisocyanate, xylylene diisocyanate, polymethylene polyphenyl isocyanate, and other such aromatic diisocyanates, tetramethylene diisocyanate, hexamethylene diisocyanate, and other such lower aliphatic diisocyanates, cyclopentylene diisocyanate, cyclohexylene diisocyanate, isophorone diisocyanate, hydrogenated products of the aforementioned aromatic diisocyanates and other such alicyclic isocyanates, and other such isocyanate-type crosslinking agents, as well as methyl etherified melamine resin, butyl etherified melamine resin, and other such melamine-type crosslinking agents, epoxy-type crosslinking agents, and so forth.

As fluorine-type compound, there is no particular limitation so long as it is a compound having at least one of either a perfluoroalkyl group or a perfluoroalkyl ether group. The fluorine-type compound may be partially modified by acid(s), hydroxyl group(s), acrylate group(s), and/or the like. Crosslinking agent may be added and crosslinking may be made to occur at modified location(s). Alternatively, a compound having at least one of either a perfluoroalkyl group or a perfluoroalkyl ether group may be added to UV-curing-type resin and polymerization may be carried out. Alternatively, there would be no objection to use in the form of a binder resin to which a small amount of a compound having a perfluoroalkyl group but not having a reactive functional group has been added.

Any one of the aforementioned resins may be used alone, or two or more thereof may be used in combination.

There is no objection to employment of any desired crosslinking agent(s) to cause crosslinking at resin(s) used in the resin functional layer of the aforementioned protective film. As crosslinking agent, tolylene diisocyanate, 2,4-tolylene diisocyanate, 4,4'-diphenylmethane diisocyanate, xylylene diisocyanate, polymethylene polyphenyl isocyanate, and other such aromatic diisocyanates, tetramethylene diisocyanate, hexamethylene diisocyanate, and other such lower aliphatic diisocyanates, cyclopentylene diisocyanate, cyclohexylene diisocyanate, isophorone diisocyanate, hydrogenated products of the aforementioned aromatic diisocyanates and other such alicyclic isocyanates, and other such isocyanate-type crosslinking agents, as well as methyl etherified melamine resin, butyl etherified melamine resin, and other such melamine-type crosslinking agents, epoxy-type crosslinking agents, and so forth may be cited as examples.

Known additive(s), e.g., antioxidant, photostabilizer, ultraviolet light absorber, crystallizing agent, and/or the like, may be added to resin(s) used in the resin functional layer of the aforementioned protective film within such range(s) as will not interfere with the benefits of the film of the present invention.

As method for applying resin(s), application by means of direct gravure coater, microgravure coater, reverse gravure coater, direct kiss coater, reverse kiss coater, comma coater, die coater, bar- or rod-type coating apparatus and so forth may be cited as examples. It is preferred that thickness of the resin functional layer following drying be not less than 10 nm but not greater than 1000 nm, more preferred that this be not less than 20 nm but not greater than 800 nm, and most preferred that this be not less than 20 nm but not greater than 500 nm. Not less than 10 nm is preferred because this will make it possible for endurance to be maintained during application of pressure. Not greater than 1000 nm is preferred because this will prevent excessive reduction in the peeling force with respect to the antifouling layer.

It is preferred that average areal roughness (Sa) of the resin functional layer be not greater than 50 nm, more preferred that this be not greater than 20 nm, and still more preferred that this be not greater than 10 nm. An average areal roughness not greater than 50 nm is preferred because there will be no possibility that when affixing the antifouling layer and the protective film there will be offsetting of nonflat features such as could worsen the external appearance of the antifouling film following detachment of the protective film. Note that what is indicated by the aforementioned average areal roughness (Sa) is the value measured under the following conditions using a noncontact surface profilometer system (VertScan R550H-M100 manufactured by Ryoka Systems Inc.).

Measurement Conditions
    Measurement mode: WAVE mode
    Objective lens: 10×
    0.5×Tube lens
    Measurement area 936 μm×702 μm Analytic Conditions
Surface Correction: Fourth-order correction
Interpolation: Complete interpolation While various materials and methods for forming the resin functional layer may be cited, it is preferred for attainment of antifouling characteristics at the antifouling layer that the contact angle of water with respect to the surface of the protective film that had been in contact with the antifouling layer be 90° to 115° and that the condition at FORMULA 1 be satisfied, there being no particular limitation with respect to material or method.

$$|a-b|<10(°)\quad\ldots\quad\text{FORMULA 1}$$

where a=contact angle (°) of water with respect to the surface of the protective film that will come in contact with the antifouling layer of the antifouling film, as it exists prior to lamination with the antifouling layer of the antifouling film; and b=contact angle (°) of water with respect to the surface of the protective film that had been in contact with the antifouling layer of the antifouling film, as it exists when detached from the antifouling layer of the antifouling film.

WORKING EXAMPLES

Below, although the present invention is described more specifically by way of working examples, the present invention should not be understood to be limited by the following working examples.

Evaluation Methods
(1) Initial Contact Angle (°)

Measurement of water contact angle was such that a goniometer ("FACE Contact Angle Meter CA-X" manufactured by Kyowa Interface Science Co., Ltd.) was used, test samples from the protective films that were obtained being placed in horizontal fashion such that the resin functional layer faced upward, contact angle in each case being taken as the average value of N=5 iterations of measurement of the contact angle of water thereon, under conditions of 22° C. and 60% RH. Note, moreover, that when determining the water contact angle, a volume of 1.8 µL was allowed to drip thereonto and this was allowed to stand for 1 minute before the contact angle was read from the device.

(2) Contact Angle Following Detachment (°)

Contact angle following detachment was such that the antifouling layer was applied and this was dried, a laminator was used to affix the target protective film to the antifouling layer so as to prevent entry of air thereinto, aging was carried out for 72 hours at 40° C., following which the protective film was detached therefrom, the contact angle of water with respect to the detached surface of the protective film at this time being taken to be the contact angle of water following detachment. Note that at the point in time when the antifouling film equipped with protective film was obtained, i.e., after the antifouling film and the protective film had been laminated together, there was no need for this to be made to undergo further operations with employment of a laminator. Measurement of contact angle was carried out using the same method as at measurement of initial contact angle. Furthermore, the contact angle of water with respect to the antifouling layer following detachment was also measured, and this is also shown at TABLE 1.

(3) Antifouling Characteristics

A laminator was used to affix the protective film to the antifouling layer of the antifouling film so as to prevent entry of air thereinto, and aging was carried out for 72 hours at 40° C., following which antifouling characteristics were judged based on ability to repel ink in the form of magic ink (M500-T1 manufactured by Teranishi Chemical Industry Co., Ltd.). Where the protective film had a resin functional layer, the laminator was used to affix this thereto in such fashion that the resin functional layer was in contact with the antifouling layer of the antifouling film. Antifouling characteristics were evaluated as GOOD when there was good ability to repel ink such that a line drawn thereon was made to be less than or equal to 1 mm after passage of a time that was less than 1 second; antifouling characteristics were evaluated as FAIR when a line drawn thereon was made to be less than or equal to 1 mm after passage of a time that was greater than or equal to one second but less than 5 seconds; and antifouling characteristics were evaluated as BAD when the ink was not repelled, width of a line drawn thereon being greater than or equal to 1 mm even after passage of a time that was greater than or equal to 5 seconds.

Preparation of Resin Solution A for Antifouling Layer

A fluorine-type resin which was made to undergo crosslinking by means of an isocyanate-type crosslinking agent was used as the antifouling layer.

100 parts by mass of fluororesin solution (30 mass % solids content; Fclear KD270R; manufactured by Kanto Denka Kogyo Co., Ltd.) and 8.1 parts by weight of crosslinking agent in the form of isocyanate-type crosslinking agent (100 mass % solids content; Duranate TPA-100; manufactured by Asahi Kasei Corporation) were diluted in methyl isobutyl ketone to prepare Resin Solution A having a solids content of 20%.

Preparation of Resin Solution B for Antifouling Layer

A silicone-type resin which was made to contain a fluorine-type component was used as the antifouling layer.

100 parts by mass of fluorine-component-containing silicone resin solution (100 mass % solids content; KR-400F; manufactured by Shin-Etsu Chemical Co., Ltd.) was diluted in methyl isobutyl ketone to prepare Resin Solution B having a solids content of 20%

Working Example 1

As coating layer for the protective film, 100 parts by mass of heat-addition-type silicone (30 mass % solids content; LTC752 manufactured by Dow Corning Toray Co., Ltd.), 0.5 part by mass of curing catalyst (SRX212 manufactured by Dow Corning Toray Co., Ltd.), and 0.5 part by mass of adhesion improver (SD7200 manufactured by Dow Corning Toray Co., Ltd.) were diluted in a solvent mixture in which methyl ethyl ketone, toluene, and normal heptane had been mixed to achieve a ratio of 1:1:1 when expressed as percent by mass to prepare Resin Functional Layer Coating Solution having a solids content of 1 mass %. As substrate film Y for the protective film, biaxial polyester film having an easy-to-adhere layer on one face thereof which was 50 µm in thickness (Cosmoshine A4100; manufactured by Toyobo Co., Ltd.) was used. Coating Solution that had been prepared in such fashion as to have a solids content of 1% was applied to the face of the polyester film on which the easy-to-adhere layer was not present in an amount sufficient to produce a coated layer thickness of 50 nm following drying, and this was dried for 60 seconds at 130° C. to obtain Protective Film.

As substrate film X for forming the antifouling layer, biaxially stretched polyethylene terephthalate film (Cosmoshine A4100; manufactured by Toyobo Co., Ltd.) having an easy-to-adhere layer on one face thereof which was 125 µm in thickness was used. Resin Solution A for Antifouling Layer that had been prepared was applied to the face of the polyethylene terephthalate film on which the easy-to-adhere layer was not present that served as substrate film X in an amount sufficient to produce an antifouling layer thickness of 10 µm following drying, and this was dried for 90 seconds at 100° C. to prepare Antifouling Film A. A hand roller was used to cause air to be removed while affixing so as to cause the resin functional layer of the protective film to come in contact with the dried antifouling layer, and a vacuum laminator (LM-30×30; manufactured by NPC Incorporated) was used to carry out lamination as a result of application of pressure under vacuum (apply vacuum for 3 minutes; application of pressure under vacuum for 5 minutes; 1 atmosphere). The affixed configuration was while still in that state thereafter made to undergo aging for 72 hours at 40° C.

Working Example 2

100 parts by mass of fluororesin (30 mass % solids content; Fclear KD270R; manufactured by Kanto Denka Kogyo Co., Ltd.), 17 parts of curing agent (100 mass % solids content; MR-400; manufactured by Tosoh Corporation), and 0.15 part by weight of curing catalyst (100 mass % solids concentration; NEOSTANN U-860; manufactured by Nitto Kasei Co., Ltd.) were diluted in a solvent mixture in which methyl ethyl ketone and toluene had been mixed to achieve a ratio of 1:1 when expressed as percent by mass to prepare Resin Functional Layer Coating Solution having a solids content of 1 mass %. The substrate film Y was coated therewith in an amount sufficient to obtain a thickness of 50 nm, this was dried for 60 seconds at 130° C., and operations were thereafter carried out as at Working Example 1 to prepare Protective Film. This was thereafter affixed to Antifouling Film A, and laminating and aging were carried out, in the same fashion as at Working Example 1.

Working Example 3

Cyclic olefin resin (100 mass % solids content; TOPAS6017S; manufactured by Polyplastics Co., Ltd.) was diluted in a solvent mixture in which toluene and tetrahydrofuran had been mixed to achieve a ratio of 4:1 when expressed as percent by mass to prepare Resin Functional Layer Coating Solution having a solids content of 1 mass %. The substrate film Y was coated therewith in an amount sufficient to obtain a thickness of 50 nm, and this was dried for 60 seconds at 130° C. to obtain Protective Film. The foregoing Protective Film was affixed to Antifouling Film A, and laminating and aging were carried out, in the same fashion as at Working Example 1.

Working Example 4

100 parts by mass of acyclic olefin resin (100 mass % solids content; GI-1000; manufactured by Nippon Soda Co., Ltd.), 17.6 parts by mass of curing agent (100% solids content by mass; MR-400; manufactured by Tosoh Corporation), and 0.6 part by weight of curing catalyst (100 mass % solids concentration; NEOSTANN U-860; manufactured by Nitto Kasei Co., Ltd.) were diluted in a solvent mixture in which methyl ethyl ketone and toluene had been mixed to achieve a ratio of 1:1 when expressed as percent by mass to prepare Resin Functional Layer Coating Solution having a solids content of 1 mass %. The substrate film Y was coated therewith in an amount sufficient to obtain a thickness of 50 nm, and this was dried for 60 seconds at 130° C. to obtain Protective Film. The foregoing Protective Film was affixed to Antifouling Film A, and laminating and aging were carried out, in the same fashion as at Working Example 1.

Working Example 5

Protective Film was obtained by means of a procedure identical to that at Working Example 1. Biaxially stretched polyethylene terephthalate film (Cosmoshine A4100; manufactured by Toyobo Co., Ltd.) having an easy-to-adhere layer on one face thereof which was 125 µm in thickness was used as substrate film X for forming the antifouling layer, Resin Solution B for Antifouling Layer that had been prepared was applied to the face of the polyethylene terephthalate film on which the easy-to-adhere layer was not present that served as substrate film in an amount sufficient to produce an antifouling layer thickness of 10 µm following drying, and this was dried for 90 seconds at 100° C. to prepare Antifouling Film B. A hand roller was used to cause air to be removed while affixing so as to cause the resin functional layer of the protective film to come in contact with the dried antifouling layer, and a vacuum laminator (LM-30×30; manufactured by NPC Incorporated) was used to carry out lamination as a result of application of pressure under vacuum (apply vacuum for 3 minutes; application of pressure under vacuum for 5 minutes; 1 atmosphere). The affixed configuration was while still in that state thereafter made to undergo aging for 72 hours at 40° C.

Comparative Example 1

100 parts by mass of polyester urethane resin (33 mass % solids content; Vylon UR-1350; manufactured by Toyobo Co., Ltd.) and 3 parts by mass of additive (40% solids content by mass; Megaface RS-75; manufactured by DIC Corporation) were diluted in a solvent mixture in which methyl ethyl ketone and toluene had been mixed to achieve a ratio of 1:1 when expressed as percent by mass to prepare Resin Functional Layer Coating Solution having a solids content of 1 mass %. The substrate film Y was coated therewith in an amount sufficient to obtain a thickness of 50 nm, and this was dried for 60 seconds at 130° C. to obtain Protective Film. The foregoing Protective Film was affixed to the Antifouling Film, and laminating and aging were carried out.

Comparative Example 2

100 parts by mass of acrylic acid ester (100 mass % solids content; NK Ester A-DPH; manufactured by Shin-Nakamura Chemical Co., Ltd.), 1 part by mass of fluorine compound (100% solids content by mass; Optool DAC-HP; manufactured by Daikin Industries, Ltd.), and 10 parts by weight of initiator (100 mass % solids concentration; OMNIRAD127; manufactured by IGM Resins) were diluted in a solvent mixture in which methyl ethyl ketone and toluene had been mixed to achieve a ratio of 1:1 when expressed as percent by mass to prepare Resin Functional Layer Coating Solution having a solids content of 1 mass %. The substrate film Y was coated therewith in an amount sufficient to obtain a thickness of 1000 nm, this was dried for 30 seconds at 90° C., and a high-pressure mercury vapor lamp was thereafter used to irradiate this with ultraviolet light so as to achieve 150 mJ/cm² to obtain Protective Film. The foregoing Protective Film was thereafter affixed to the Antifouling Film, and laminating and aging were carried out, in the same fashion as at Working Example 1.

Comparative Example 3

100 parts by mass of melamine resin (30 mass % solids content; Super Beckamine L-109-65; manufactured by DIC Corporation), 3 parts by mass of additive (5% solids content by mass; Megaface F444; manufactured by DIC Corporation), 1 part by mass of additive (SD7200 manufactured by Dow Corning Toray Co., Ltd.), and 3 parts by mass of catalyst (5% solids content by mass; Beckamine P-198; manufactured by DIC Corporation) were diluted in a solvent mixture in which methyl ethyl ketone and toluene had been mixed to achieve a ratio of 1:1 when expressed as percent by mass to prepare Resin Functional Layer Coating Solution having a solids content of 1 mass %. The substrate film Y was coated therewith in an amount sufficient to obtain a thickness of 50 nm, and this was dried for 60 seconds at 130° C. to obtain Protective Film. The foregoing Protective Film was affixed to the Antifouling Film, and laminating and aging were carried out, in the same fashion as at Working Example 1.

Comparative Example 4

Protective Film was obtained by means of a procedure identical to that at Comparative Example 1. Furthermore, a procedure similar to that at Working Example 5 was used to prepare Antifouling Film B. A hand roller was used to cause air to be removed while affixing so as to cause the resin functional layer of the protective film to come in contact with the dried antifouling layer, and a vacuum laminator (LM-30×30; manufactured by NPC Incorporated) was used to carry out lamination as a result of application of pressure under vacuum (apply vacuum for 3 minutes; application of pressure under vacuum for 5 minutes; 1 atmosphere). The affixed configuration was while still in that state thereafter made to undergo aging for 72 hours at 40° C.

Results of Evaluation

The contact angle of water with respect to the resin functional layer of the protective film at Working Examples 1 through 5 following detachment being 90° to 115°, the antifouling layer of the antifouling film displayed excellent antifouling characteristics. Because the contact angle of water following detachment at Comparative Examples 1 through 4 was less than 90°, there was reduction in the antifouling characteristics of the antifouling layer, this perhaps being due to partial offsetting of components making up the resin functional layer of the protective film onto the antifouling layer of the antifouling film.

TABLE 1

|  | Antifouling Film | | Protective Film | | | | | | |
|---|---|---|---|---|---|---|---|---|---|
|  |  | Water contact angle (°) Antifouling layer following detachment | Primary constituent of resin functional layer | Thickness of resin functional layer (nm) | Solids content of silicone-type, fluorine-type, olefin-type, or cyclic-olefin-type resin (mass %) | Water contact angle (°) | | | Antifouling Film Antifouling characteristics |
|  | Type |  |  |  |  | a. The side of resin functional layer before detachment | b. The side of resin functional layer after detachment | \|a − b\| (°) |  |
| Working Example 1 | A | 100 | Silicone resin | 50 | 96.8 | 111 | 110 | 1 | GOOD |
| Working Example 2 | A | 102 | Fluororesin | 50 | 63.6 | 95 | 102 | 7 | GOOD |
| Working Example 3 | A | 102 | Cyclic olefin resin | 50 | 100.0 | 93 | 96 | 3 | GOOD |
| Working Example 4 | A | 98 | Acyclic olefin resin | 50 | 84.6 | 100 | 97 | 3 | GOOD |
| Working Example 5 | B | 103 | Silicone resin | 50 | 96.8 | 107 | 104 | 3 | GOOD |
| Comparative Example 1 | A | 86 | Urethane resin | 50 | 0.0 | 71 | 56 | 15 | BAD |
| Comparative Example 2 | A | 99 | Acrylic resin | 1000 | 0.0 | 96 | 84 | 12 | FAIR |
| Comparative Example 3 | A | 90 | Melamine resin | 50 | 0.5 | 78 | 79 | 1 | BAD |
| Comparative Example 4 | B | 104 | Urethane resin | 50 | 0.0 | 73 | 59 | 14 | BAD |

INDUSTRIAL UTILITY

The antifouling film equipped with protective film of the present invention has excellent antifouling characteristics even after undergoing aging, and may be favorably used as an antifouling film for protecting displays or for protecting building materials, household appliances, furniture, and so forth.

The invention claimed is:
1. An antifouling film equipped with a protective film, wherein:
the antifouling film comprises an antifouling layer on a first substrate film;
the protective film comprises a resin functional layer on a second substrate film, the protective film being lami- nated on the antifouling film such that a surface of the resin functional layer contacts the antifouling layer;

the antifouling layer comprises not less than 50 mass % of a silicone-based resin and/or a fluorine-based resin;

the resin functional layer comprises not less than 60 mass % of all resin in the resin functional layer of at least one resin selected from the group consisting of a silicone-based resin, a cyclic-olefin-based resin, an acyclic-olefin-based resin, and a fluorine-based resin;

the surface of the resin functional layer satisfies FORMULA 1;

$$|a-b| \leq 10(°) \qquad \text{FORMULA 1;}$$

A is a contact angle of water of the surface of the resin functional layer measured prior to lamination of the protective film on the antifouling film;

B is a contact angle of water of the surface of the resin functional layer measured after lamination of the protective film on the antifouling film, aging for 72 hours at 40° C., and then detaching the protective film from the antifouling film, the contact angle B being 90° to 115°; and the contact angle A and contact angle B are measured at 22° C. and 60% RH by letting 1.8 µL of water stand on the surface of the resin functional layer for 1 minute.

2. A method for manufacturing the antifouling film equipped with the protective film according to claim 1, wherein the protective film is laminated on the antifouling film such that the surface of the resin functional layer contacts the antifouling layer and then the antifouling film equipped with the protective film is aged for not less than one day at a temperature which is not less than 30° C. but not greater than 60° C.

* * * * *